(12) United States Patent
Lubezny et al.

(10) Patent No.: US 8,539,741 B2
(45) Date of Patent: Sep. 24, 2013

(54) SEAL AND CUT METHOD AND APPARATUS

(75) Inventors: Vadim A. Lubezny, Buffalo Grove, IL (US); Steven P. Bergholt, Hampshire, IL (US)

(73) Assignee: Triangle Package Machinery Company, Chicago, IL (US)

( * ) Notice: Subject to any disclaimer, the term of this patent is extended or adjusted under 35 U.S.C. 154(b) by 514 days.

(21) Appl. No.: 12/703,434

(22) Filed: Feb. 10, 2010

(65) Prior Publication Data
US 2011/0192117 A1 Aug. 11, 2011

(51) Int. Cl.
*B65B 43/08* (2006.01)
(52) U.S. Cl.
USPC ............ 53/456; 53/451; 53/551; 53/558
(58) Field of Classification Search
USPC ............ 53/451, 452, 373.5, 551, 554, 456, 53/477, 558, 370.7
See application file for complete search history.

(56) References Cited

U.S. PATENT DOCUMENTS

| | | |
|---|---|---|
| 3,629,987 A | 12/1971 | Klopfenstein et al. |
| 3,761,016 A | 9/1973 | Pederson |
| 3,925,963 A | 12/1975 | Greenwalt et al. |
| 4,120,235 A | 10/1978 | Beck et al. |
| 4,199,919 A | 4/1980 | Moscatelli |
| 4,219,988 A | 9/1980 | Shanklin et al. |
| 4,241,563 A | 12/1980 | Muller et al. |
| 4,290,253 A | 9/1981 | Domke et al. |
| 4,291,520 A | 9/1981 | Prince et al. |
| 4,516,379 A | 5/1985 | Iain |
| RE32,018 E | 11/1985 | Domke et al. |
| 4,566,250 A | 1/1986 | Matsumura et al. |
| 4,580,392 A | 4/1986 | Lagerstedt et al. |
| 4,603,540 A | 8/1986 | Kopp |
| 4,608,797 A | 9/1986 | Shabram, Jr. et al. |
| 4,622,793 A | 11/1986 | Oki |
| 4,630,429 A | 12/1986 | Christine |
| 4,663,917 A | 5/1987 | Taylor et al. |
| 4,663,971 A | 5/1987 | Bakula |
| 4,709,183 A | 11/1987 | Lange |
| 4,722,373 A | 2/1988 | Roovers |
| 4,735,675 A * | 4/1988 | Metz .................. 156/583.4 |
| 4,750,313 A | 6/1988 | Kammler et al. |
| 4,751,808 A | 6/1988 | Hadden |
| 4,757,668 A | 7/1988 | Klinkel et al. |

(Continued)

OTHER PUBLICATIONS

International Search Report in International Application No. PCT/US2011/024281, mailed Apr. 15, 2011, 2 pages.

(Continued)

*Primary Examiner* — Thanh Truong
(74) *Attorney, Agent, or Firm* — Brinks Hofer Gilson & Lione

(57) ABSTRACT

A method for forming a bag includes moving a film at a first velocity, forming a seal on the moving film with a sealing device moving at the first velocity, moving the film and the sealing device relative to each other and thereby moving the sealing device out of alignment with the seal, aligning a film separation device with the seal on the moving film, moving the film separation device with the moving film, and separating the film across the seal with the film separation device. A sealing and cutting device includes a carriage moveable along a longitudinal axis and upper and lower grippers coupled to the carriage. A sealing device and a cutting device are positioned between the upper and lower grippers.

14 Claims, 5 Drawing Sheets

(56) References Cited

U.S. PATENT DOCUMENTS

| | | |
|---|---|---|
| 4,768,330 A | 9/1988 | Lane, Jr. et al. |
| 4,779,400 A | 10/1988 | Hoskinson et al. |
| 4,782,643 A | 11/1988 | Stark |
| 4,803,827 A | 2/1989 | Posey et al. |
| 4,840,009 A | 6/1989 | Rentmeester et al. |
| 4,862,673 A | 9/1989 | Francioni |
| 4,947,618 A | 8/1990 | Schneider et al. |
| 4,947,623 A | 8/1990 | Saito et al. |
| 4,974,395 A | 12/1990 | McMahon |
| 4,996,825 A | 3/1991 | Bacon et al. |
| 5,001,891 A | 3/1991 | Abate |
| 5,031,383 A | 7/1991 | Hustad |
| 5,062,253 A | 11/1991 | Bacon et al. |
| 5,067,302 A | 11/1991 | Boeckmann |
| 5,079,902 A | 1/1992 | Seko et al. |
| 5,167,107 A | 12/1992 | Terminella et al. |
| 5,177,937 A | 1/1993 | Alden |
| 5,191,750 A | 3/1993 | Kammler |
| 5,203,145 A | 4/1993 | Kammler et al. |
| 5,279,098 A | 1/1994 | Fukuda |
| 5,335,479 A | 8/1994 | Lemke et al. |
| 5,347,795 A | 9/1994 | Fukuda |
| 5,351,464 A | 10/1994 | Francioni |
| 5,398,486 A | 3/1995 | Kauss et al. |
| 5,511,363 A | 4/1996 | Doede |
| 5,524,420 A | 6/1996 | Ikuta |
| 5,533,322 A | 7/1996 | Bacon et al. |
| 5,540,032 A | 7/1996 | Sosnik et al. |
| 5,540,035 A | 7/1996 | Plahm et al. |
| 5,551,206 A | 9/1996 | Fukuda |
| 5,581,984 A | 12/1996 | Domke et al. |
| 5,584,166 A | 12/1996 | Lakey |
| 5,669,201 A | 9/1997 | Simionato |
| 5,685,131 A | 11/1997 | Spatolisano et al. |
| 5,685,132 A | 11/1997 | Romijn et al. |
| 5,694,745 A | 12/1997 | Spatafora et al. |
| 5,715,656 A | 2/1998 | Pearce |
| 5,727,366 A | 3/1998 | Manly, Jr. |
| 5,746,043 A | 5/1998 | Terminella et al. |
| 5,752,370 A | 5/1998 | Linkiewicz |
| 5,753,067 A | 5/1998 | Fukuda et al. |
| 5,768,861 A | 6/1998 | Slenders |
| 5,778,641 A | 7/1998 | Simionato |
| 6,021,621 A | 2/2000 | Linkiewicz |
| 6,052,971 A | 4/2000 | Malsam et al. |
| 6,079,469 A | 6/2000 | Stirnkorb et al. |
| 6,138,442 A | 10/2000 | Howard et al. |
| 6,178,726 B1 | 1/2001 | Takigawa |
| 6,182,426 B1 | 2/2001 | Pritchard |
| 6,301,859 B1 | 10/2001 | Nakamura et al. |
| 6,367,230 B1 | 4/2002 | Fukuda |
| 6,378,277 B1 | 4/2002 | Inoue et al. |
| 6,408,596 B1 | 6/2002 | Kammler |
| 6,524,434 B1 | 2/2003 | Domke et al. |
| 6,572,267 B1 | 6/2003 | Forman |
| 6,598,367 B2 | 7/2003 | Nakagawa et al. |
| 6,604,343 B2 | 8/2003 | Fukuda |
| 6,665,999 B1 | 12/2003 | Dierl et al. |
| 6,761,016 B1 | 7/2004 | Soleri |
| 6,871,476 B2 | 3/2005 | Tobolka |
| 6,932,751 B1 | 8/2005 | Ward et al. |
| 6,966,166 B2 | 11/2005 | Kissling |
| 6,986,232 B1 | 1/2006 | Kume et al. |
| 7,000,366 B2 | 2/2006 | Borghi et al. |
| 7,028,451 B2 | 4/2006 | Braun et al. |
| 7,036,293 B2 | 5/2006 | Kammler et al. |
| 7,069,707 B2 | 7/2006 | Braun et al. |
| 7,069,709 B2 | 7/2006 | Matheyka et al. |
| 7,121,067 B2 | 10/2006 | Fukuda et al. |
| 7,299,604 B2 | 11/2007 | Kammler et al. |
| 7,305,808 B2 | 12/2007 | Fukuda et al. |
| 7,325,386 B2 | 2/2008 | Kissling |
| 7,546,722 B2 | 6/2009 | Tsuruta |
| 7,555,878 B2 | 7/2009 | Brioschi |
| 2002/0104292 A1* | 8/2002 | Tsuruta .......................... 53/451 |
| 2002/0162305 A1 | 11/2002 | Miyamoto et al. |
| 2005/0155331 A1 | 7/2005 | Matheyka et al. |
| 2005/0262812 A1 | 12/2005 | Thorpe |
| 2005/0262815 A1 | 12/2005 | Kuss et al. |
| 2006/0075724 A1 | 4/2006 | Kammler et al. |
| 2006/0236659 A1 | 10/2006 | Miyazawa et al. |
| 2007/0062158 A1 | 3/2007 | Boldrini et al. |
| 2008/0066430 A1 | 3/2008 | Lubezny |

OTHER PUBLICATIONS

Written Opinion in International Application No. PCT/US2011/024281, mailed Apr. 15, 2011, 6 pages.

Brochure, "Constant Motion VFFS XY", Triangle Package Machinery Company, Chicago, IL, date unknown, 2 pages.

* cited by examiner

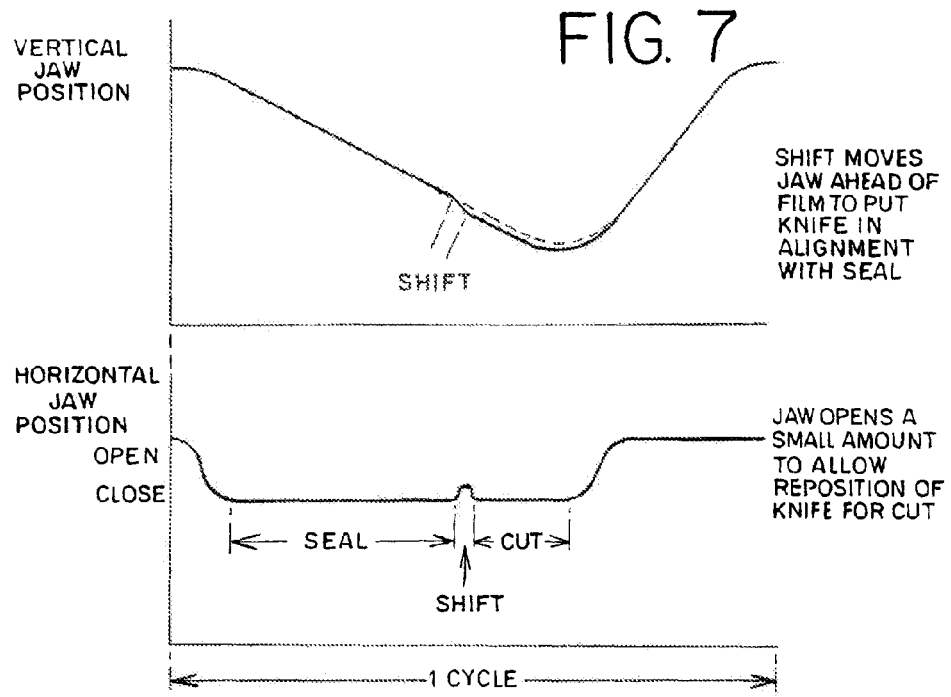
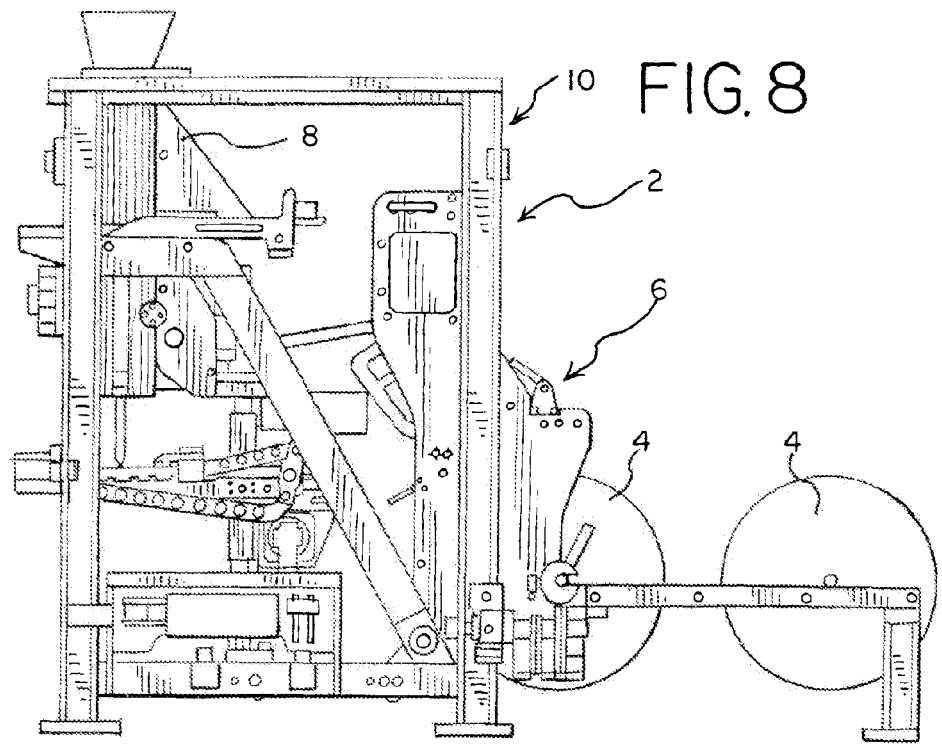

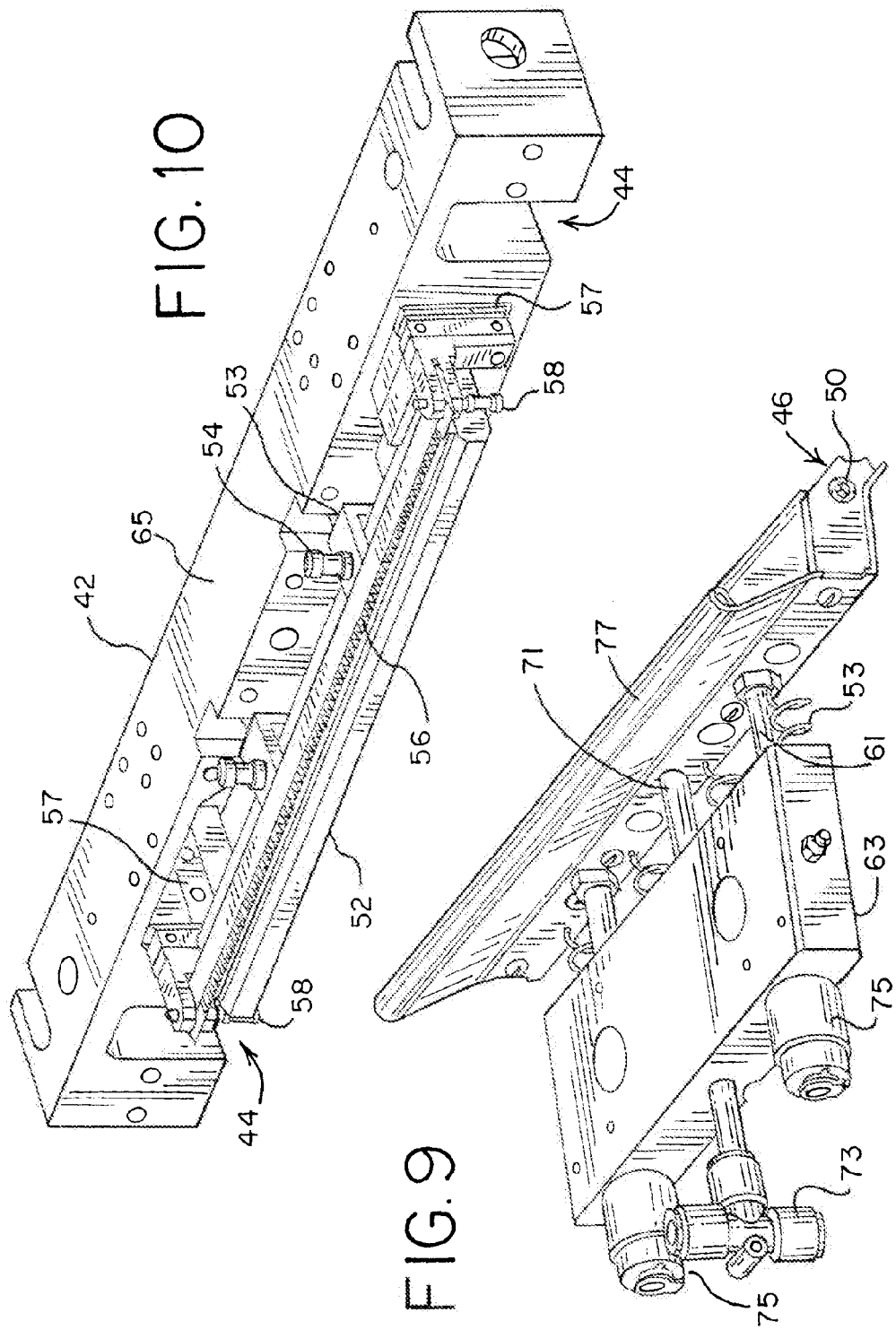

SEAL AND CUT METHOD AND APPARATUS

FIELD OF THE INVENTION

The present invention relates generally to method of sealing and cutting a film and to a sealing and cutting device.

BACKGROUND

Form, fill and seal bag machines are often configured to form simultaneously upper and lower seals on adjacent bags, with the seals separated by a small space. After the upper seal is formed, a knife, or other cutting device, cuts the film between the upper and lower seals thereby separating the lower bag for subsequent packaging efforts. In such a configuration, a small skirt of non-sealed film may be formed at the upper and lower ends of each bag. Product that was forced out of the bag into the spaced between the upper and lower seals may be retained in the unsealed skirt, potentially leading to spoilage and contamination of the product and storage areas.

SUMMARY

The present invention is defined by the following claims, and nothing in this section should be considered to be a limitation on those claims.

In one aspect, one embodiment of a method for forming a bag includes moving a film at a first velocity, forming a seal on the moving film with a sealing device moving at the first velocity, moving the film and the sealing device relative to each other and thereby moving the sealing device out of alignment with the seal, aligning a film separation device with the seal on the moving film, moving the film separation device with the moving film, and separating the film across the seal with the film separation device.

In another aspect, a method for forming a bag includes moving a film at a first velocity, gripping the moving film a first time with a pair of jaws and forming a seal on the moving film with a sealing device coupled to the jaws while moving the jaws at the first velocity. The method further includes releasing the film from the jaws a first time, moving the film and jaws relative to each other and thereby moving the sealing device out of alignment with the seal, and aligning a cutting device coupled to at least one of the jaws with the seal on the moving film. The method further includes gripping the film a second time with the pair of jaws when the cutting device is aligned with the seal, cutting the film across the seal with the cutting device, and releasing the film from the jaws a second time.

In yet another aspect, a sealing and cutting device includes a carriage that is moveable along a longitudinal axis. Upper and lower grippers are coupled to the carriage. A sealing device and a cutting device are positioned between the upper and lower grippers. In one embodiment, the cutting device is moveably coupled to the carriage, and is moveable relative to the carriage and grippers along a lateral axis or direction.

The various embodiments of the sealing and cutting device, and methods for the use thereof, provide significant advantages over other form, fill and seal machines, and components used therein. For example and without limitation, a continuous seal is formed between adjacent upper and lower bags. In this way, any unsealed skirt material is eliminated, thereby avoiding the possibility of accumulation of product or other contaminants in the skirt, and possible subsequent contamination of other products or storage areas.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

BRIEF DESCRIPTION OF THE DRAWINGS

FIG. 7 are graphs representing the horizontal and vertical positions of the jaw during a sealing and cutting cycle.

FIG. 8 is a side view of one embodiment of a form, fill and seal machine.

FIG. 9 is an exploded rear perspective view of a sealing and cutting jaw.

FIG. 10 is a perspective view of a sealing and cutting jaw with the grippers removed.

DETAILED DESCRIPTION OF THE PRESENTLY PREFERRED EMBODIMENTS

It should be understood that the term "plurality," as used herein, means two or more. The term "longitudinal," as used herein means of or relating to length or the lengthwise direction, and includes the direction of film movement through a form, fill and seal machine. The term "lateral," as used herein, means situated on, directed toward or running from side to side, and includes a direction transverse to the direction of film movement through a form, fill and seal machine. The term "coupled" means connected to or engaged with whether directly or indirectly, for example with an intervening member, and does not require the engagement to be fixed or permanent, although it may be fixed or permanent, and includes both mechanical and electrical connection. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first velocity may be the same as a second velocity, with each simply being applicable to different components and/or time periods.

U.S. Pat. Nos. 5,715,656 and 5,752,370, assigned to Triangle Package Machinery Company, the same Assignee as the present application, disclose various components of form, fill and seal machines, the entirety of which patents are hereby incorporated herein by reference.

Referring to FIG. 8, a form, fill and seal machine includes a frame 2 and a film cage 6 configured to hold and store rolls 4 of film. The film cage includes dancer rollers that control/maintain the tension of the film as it is introduced to the machine. The dancer rolls speed up or slow down the power unwind of the film from the film roll 4.

Figure 1:
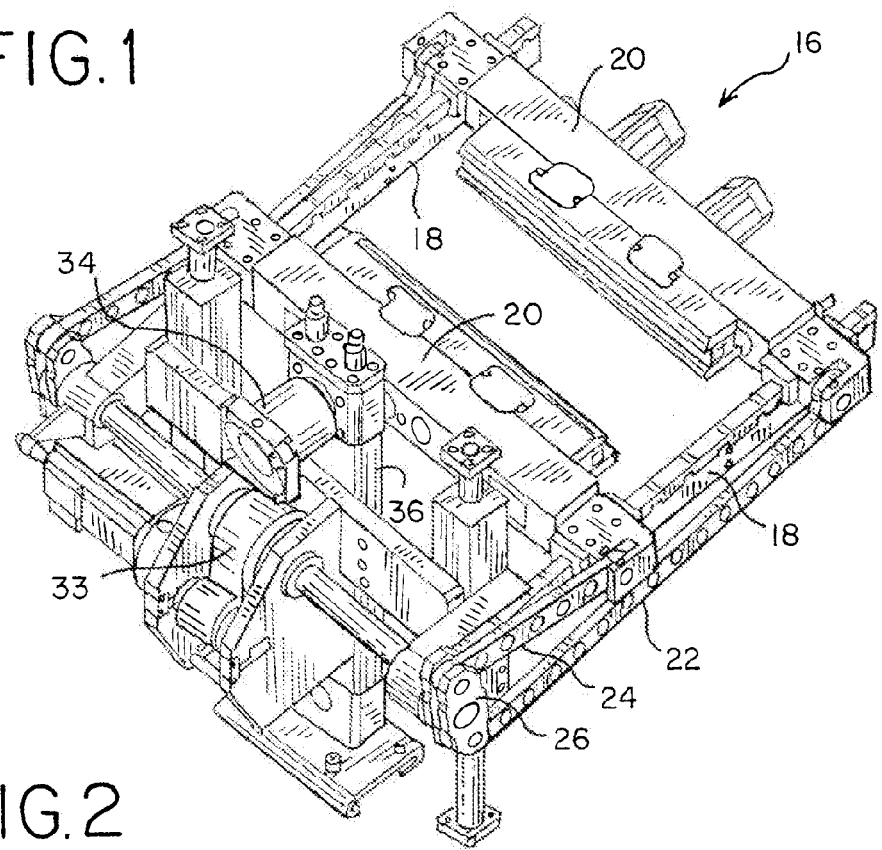
FIG. 1 is a perspective view of one embodiment of a sealing and cutting device.
Figure 2:
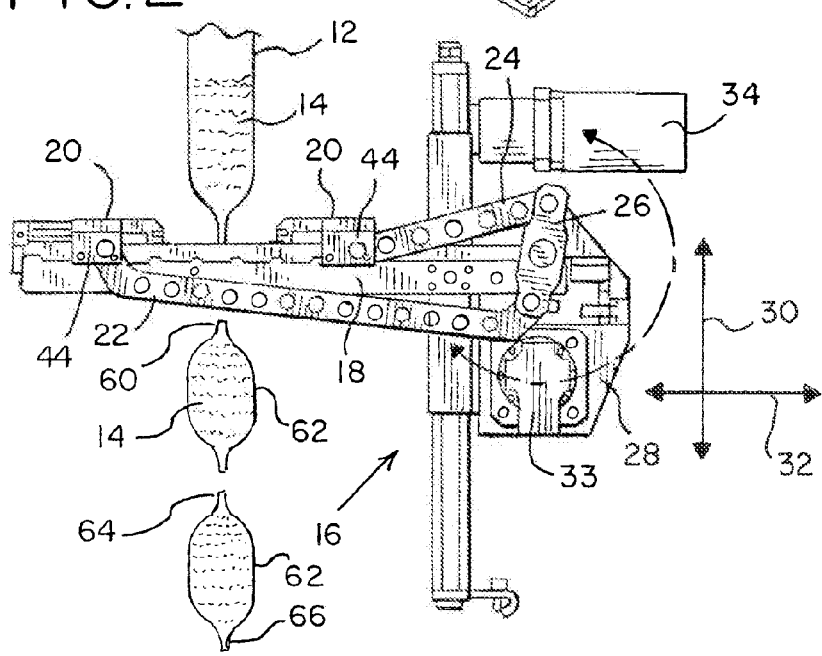
FIG. 2 is a side view of the device shown in FIG. 1.
Figure 4:
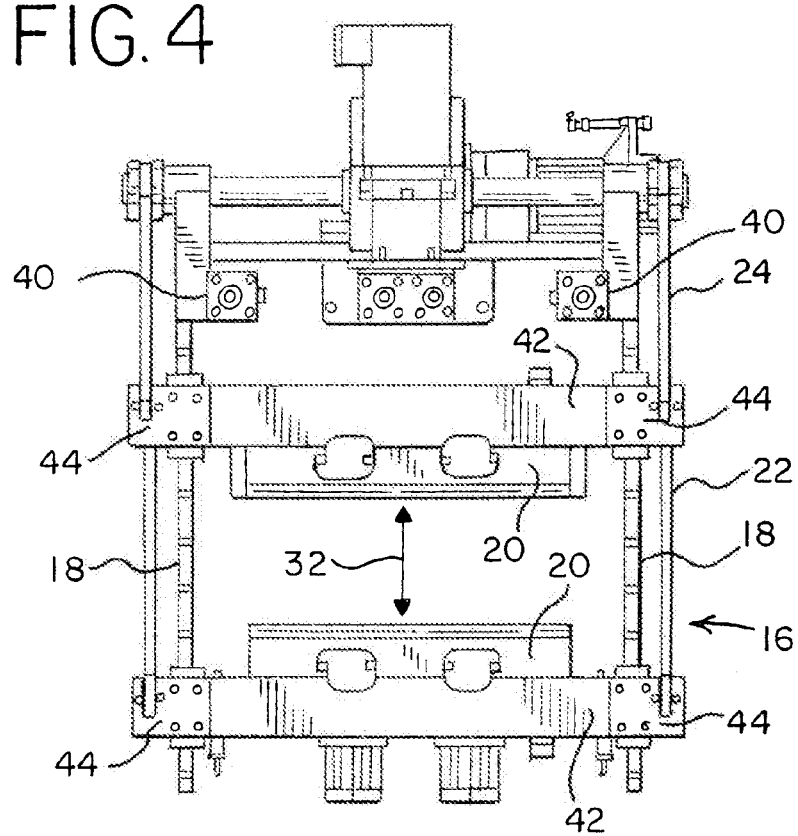
FIG. 4 is a top view of the device shown in FIG. 1.
Figure 3:
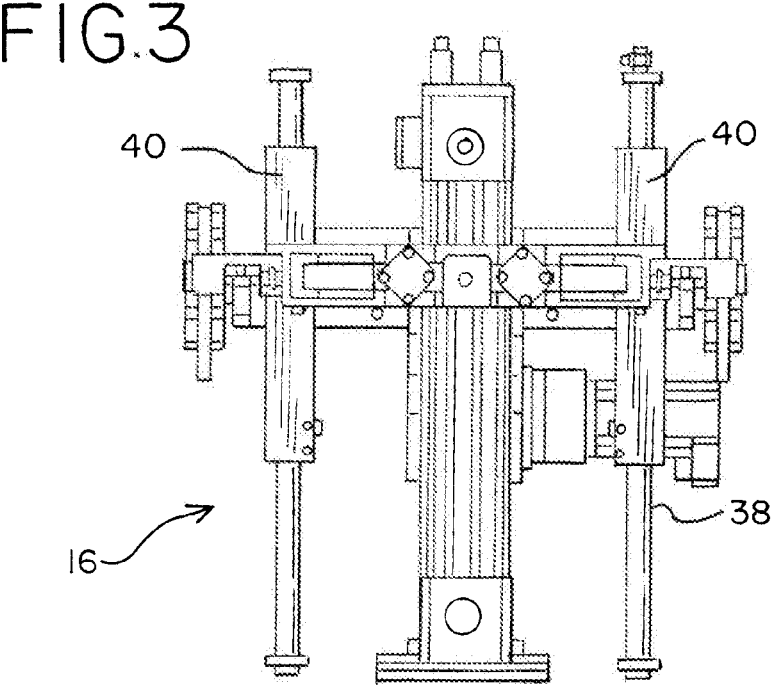
FIG. 3 is a front view of the device shown in FIG. 1.

Referring to FIGS. 2 and 8, the film is unrolled from the roll 4 and is guided to a forming shoulder 8, which forms the film into a tubular structure around a forming tube. As is well known in the art, packages of various shapes and sizes can be formed by changing the forming tube and forming shoulder. A vertical back sealer 10 seals the film to form a film tube 12. Product 14, including for example and without limitation various liquid or solid food products, is loaded through an open end of the forming tube into the film tube 12, which is sealed to form a bag 62 filled with the product 14.

Referring to FIGS. 1-4, a sealing and cutting device 16 is shown. The device includes a drive system having a pair of rails 18 that carry a pair of jaws 20. The jaws 20 are moved together and apart on the rails by a pair of arms 22, 24, which are driven in turn by a pivot lever 26. A servo motor 32 rotates the pivot lever 26 in opposite first and second rotational directions so as to move the jaws 20 toward and away from each other as the jaws are supported by the rails. The rails 18 and jaws 20 are carried by, and move vertically with, a carriage assembly 28 in a longitudinal direction 30. The carriage is mounted on a pair of linear guides 38. A servo belt drive, including a servo motor 34 and belt 36 with air assist, moves the carriage assembly 28 up and down in a longitudinal direction 30 on the vertical guides 38. The guides 38 include a damping system 40 of air pressure. As such, the carriage assembly 28 can move along the guides at high speeds and accelerations with reduced wear and tear on the system. In addition, the jaws 20 can be moved toward and away from each other in a lateral direction 32 independently of the vertical movement of the carriage assembly 28 by actuation of the motor 33 that is coupled to the pivot lever. As such, the jaws 20 can be held at a constant pressure over an entire vertical travel of the jaws if desired, and can otherwise be laterally moved as further explained below. The movement of the carriage assembly and the actuation of the jaws is programmable, and can be configured or operated by a controller, such as a computer, having a user interface. In one embodiment, the systems is controlled by Rockwell Automation's ControlLogix, with a touchscreen human-machine interface.

Figure 5:
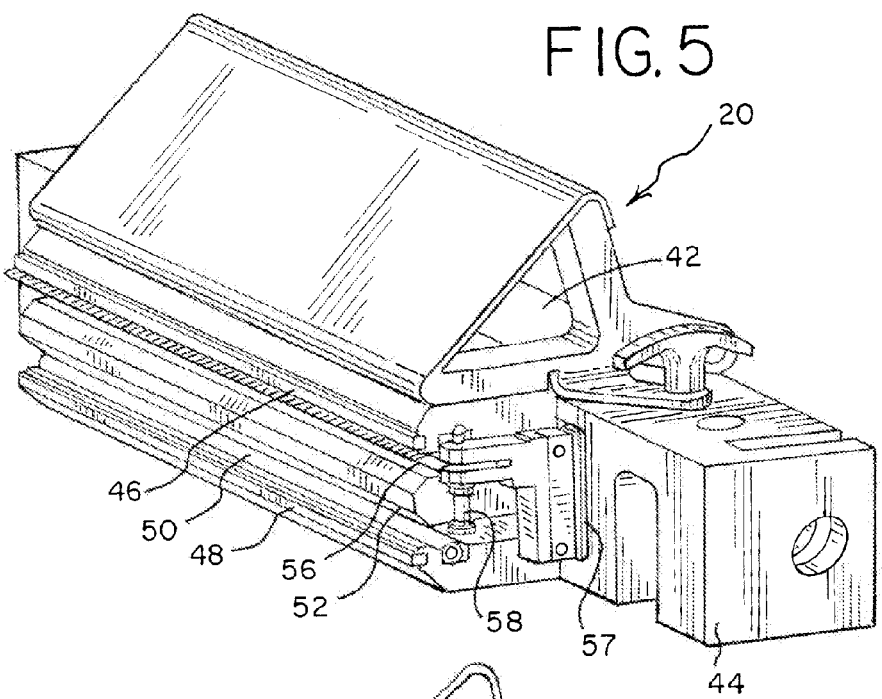
FIG. 5 is an enlarged perspective view of one embodiment of a sealing and cutting jaw.
Figure 6:
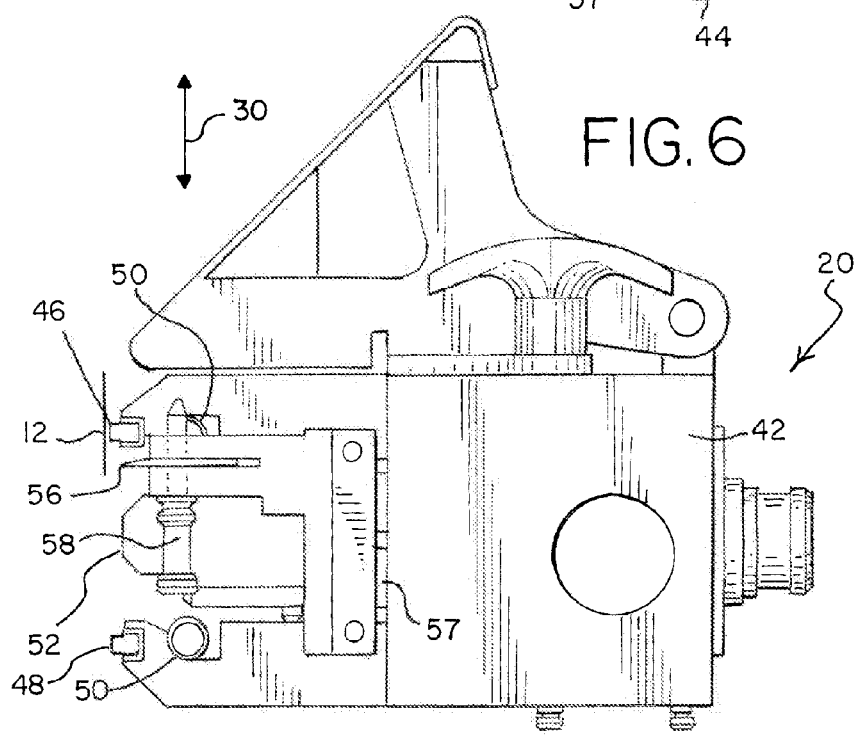
FIG. 6 is a side view of the jaw shown in FIG. 5.

Referring to FIGS. 2, 4-6 and 9-10, the jaws 20 of the sealing and cutting device each include a carriage 42 that is moveable along the longitudinal direction 30 or axis with the rails 18 and carriage 28. It should be understood that only a single jaw is shown in FIGS. 5 and 6 for the sake of simplicity, but that a mirror image jaw is positioned on the other side of the film tube 12, except that in a preferred embodiment only one jaw is provided with a film separation device. In other embodiments, both jaws can configured with a film separation device, such as providing respective knife and anvil components on the opposing jaws.

The jaw carriages 42 each have guides 44 positioned on opposite ends thereof. The guides 44 each include a channel that receives a respective one of the rails 18, with the guides moving on the rails. Each carriage includes upper and lower grippers 46, 48 mounted thereto. The upper and lower grippers 46, 48 are longitudinally spaced and in one embodiment have a length equal to or greater than the width of the film tube 12.

In one embodiment, and with reference to FIG. 9, the upper and lower grippers are spring 53 loaded, such that they can move laterally relative to the carriage 42, and to the sealing devices, as the opposing jaws 20 are closed with the film tube 12 disposed therebetween. The plurality of springs 53 bias each gripper away from a mounting block 63, which is mounted to and forms part of the carriage, with a plurality of guide rods 61 moveably supporting the gripper. The gripper mounting blocks are fastened to a sealing device carrier 65, or beam, to form the carriage 42. Air tubes 50 are configured with a plurality of small holes that supply air to cool the seal area when the seal jaws 29 are partially open. An air supply tube 71, coupled to an air supply with a fitting 73, supplies air to the air tubes 50. In an alternative embodiment, the lateral movement of the gripper is controlled by one or more actuation cylinders 75 which programmably extend and retract the grippers. A catch plate 77 is attached to each of the upper grippers to prevent product from contacting or falling onto the hot seal jaws.

A sealing device 52 is mounted to the carriage between the upper and lower grippers 46, 48. The sealing device 52, in one embodiment, has a length equal to or greater than the width of the film tube 12. The sealing device 52 may be configured as a heat seal bar, an ultrasonic sealing device or other suitable sealing device. In one embodiment, the sealing device is configured as an insert, which is secured to the carriage 42, and in particular a pair of clevises 53, with a quick-release mechanism 54, including for example and without limitation removable pins.

A film separation device 56 is mounted to at least one of the carriages between the upper and lower grippers 46, 48. The film separation device 56, in one embodiment, has a length equal to or greater than the width of the film tube 12. The film separation device 56 is configured in one embodiment as a cutting device, such as a knife, secured to one of the opposing carriages 42. It should be understood that the film separation device can include other types of cutting devices including without limitation air and water jets, hot wire, die, shear, ultrasonic devices, and/or combinations thereof, positioned between the upper and lower grippers. In one embodiment, the film separation device 56 is secured to the carriage 42 with a quick-release mechanism 58, including for example and without limitation removable pins. The film separation device 56 is laterally moveable relative to the carriage 42 and sealing device 52 with an actuation cylinder 57 from a cutting position to a retracted position.

In operation, and with reference to FIGS. 2, 5-7 and 9, the carriage assembly 28 is moved in the vertical, or longitudinal direction 30, at the same speed and velocity as the film tube 12. The jaws 20 are closed by moving the pivot lever 26, which drives the jaws together, with the upper and lower grippers 46, 48 gripping the film tube 12. The sealing devices 52 are then moved laterally toward each other to form a cross seal 60 as the grippers 46, 48 are biased against the force of the springs 53, thereby closing and sealing the film tube 12 as the jaws move at the same velocity as the film tube. In this way, the sealing device 52 is moved laterally relative to the grippers 46, 48. The jaws 20 then open a slight distance, for example about 10-15 mm, and move at a different velocity relative to the film tube 12 until the film separation device 56 is aligned with the seal 60 and the sealing device 52 is moved out of alignment with the seal. It should be understood that the film separation device is "aligned" with the seal as long as it cuts the film across the seal, and is preferably, but not necessarily, longitudinally centered on the seal. It should be understood that sealing device is positioned out of alignment relative to the seal when the sealing device is moved relative to the seal a sufficient distance such that the film separation device overlaps and can cut across the seal, and preferably includes the sealing device not being substantially longitudinally centered relative to the seal, but may include the sealing device overlapping with portions of the seal.

After the film separation device is aligned with the seal, the jaws 20 are then closed again, with the upper and lower grippers 46, 48 again gripping the film tube 12 as the carriage 28 moves at the same speed and velocity as the film tube 12. The jaws 20 are not moved toward each other with as great a pressure such that the upper and lower grippers 46, 48 grip the film by the sealing device 52 does not contact the film. The film separation device 56 is then actuated, for example by moving the cutting device laterally to thereby cut the film tube across the seal 60. Alternatively, the jaws can be closed with an extended knife so as to make the cut while moving with the film, preferably proximate the longitudinal centerline of the seal 60.

The film tube is filled with product 14 after a first lower seal is made and before a next upper seal is formed. After the film tube is filled, the next upper seal is formed to thereby form a bag 62 of product, and the cut is made across the seal to separate the filled bag from the film tube above. In this way, the filled bag 62 is sealed at the top and bottom thereof all of the way to the edges 64, 66 thereof, which edges are formed by the cut sequence. The sequence of the seal formation, carriage shift and cut may be accomplished in several alternative ways.

In one sequence, the jaws 20 accelerate and decelerate in the longitudinal direction 30 while the film tube 12 is maintained at a constant velocity. For example, the jaws 20 close on the film tube and move at the same velocity as the film as the seal 60 is formed. The jaws 20 then open and accelerate or decelerate to align the film separation device 56 with the seal 62, preferably at a longitudinal centerline thereof. The jaws 20 then move at the same velocity as the film tube 12 and close again as a cut is made. The jaws 20 may then open and accelerate to a new position above the cut to initiate a new seal and cut sequence.

Alternatively, the film tube 12 is accelerated and decelerated while the jaws 20 move at a constant velocity. For example, the jaws 20 close on the film tube 12 and move at the same velocity as the film tube 12 as the seal 60 is formed. The jaws 20 are then opened and the film tube 12 is accelerated or decelerated to align the film separation device 56 with the seal 62, preferably at a longitudinal centerline thereof. The film tube 12 then moves at the same velocity as the jaws 20 as the jaws are again closed and a cut is made. The jaws are then moved relative to the film above the cut to initiate a new seal and cut sequence.

In yet another alternative, the film and jaw velocities are both changed to provide for the differential placement of the carriage sealing device and film separation device at the same location.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A method for forming a bag comprising:
moving a film at a first velocity;
forming a seal on said moving film with a sealing device moving at said first velocity, wherein said sealing device comprises a pair of jaws each comprising an upper and lower gripper formed on each of said jaws and a sealing member, wherein said sealing member is positioned between said upper and lower grippers, and wherein said forming said seal on said moving film comprises closing said pair of jaws and gripping said film with said upper and lower grippers;
moving said film and said sealing device relative to each other and thereby moving said sealing device out of alignment with said seal;
aligning a film separation device with said seal on said moving film and moving said film separation device with said moving film, wherein said film separation device is coupled to at least one of said pair of jaws and is positioned between said upper and lower grippers of said at least one of said pair of jaws; and
separating said film across said seal with said film separation device.

2. The method of claim 1 wherein said film separation device comprises a knife.

3. The method of claim 1 wherein said separating said film comprises laterally moving said film separation device relative to said upper and lower grippers of said at least one of said pair of jaws.

4. The method of claim 1 wherein said forming said seal comprises laterally moving said sealing member relative to said upper and lower grippers on each of said pair of jaws.

5. The method of claim 1 wherein said moving said film and said sealing device relative to each other comprises accelerating or decelerating said sealing device.

6. The method of claim 5 wherein said film is maintained at said first velocity while said sealing device is accelerated or decelerated.

7. The method of claim 1 wherein said moving said film and said sealing device relative to each other further comprises accelerating or decelerating said film.

8. The method of claim 7 wherein said sealing device is maintained at said first velocity while said film is accelerated or decelerated.

9. The method of claim 1 wherein said moving said film and said sealing device relative to each other comprises accelerating or decelerating said film and said sealing device.

10. The method of claim 1 wherein said sealing device comprises a heat seal bar.

11. The method of claim 1 wherein said sealing device comprises an ultrasonic sealing device.

12. The method of claim 1 wherein said moving said film and said sealing device relative to each other comprises translating said sealing device along a vertical direction.

13. The method of claim 12 wherein said translating said sealing device along a vertical direction comprises translating said sealing device on a vertical guide.

14. A method for forming a bag comprising:
moving a film at a first velocity;
gripping said film moving at said first velocity a first time with a pair of jaws;
forming a seal on said moving film with a sealing device moving at said first velocity;
releasing said film from said pair of jaws a first time after said forming said seal;
moving said film and said sealing device relative to each other and thereby moving said sealing device out of alignment with said seal;
aligning a film separation device with said seal on said moving film and moving said film separation device with said moving film;
gripping said film a second time with said pair of jaws when said film separation device is aligned with said seal;
separating said film across said seal with said film separation device; and
releasing said film from said pair of jaws a second time after said separating said film across said seal with said film separation device.

* * * * *